March 10, 1959   W. R. KEMPF   2,877,285
PRIMARY CELL CONSTRUCTION
Filed Dec. 2, 1955

INVENTOR
Walter R. Kempf

BY
ATTORNEY

United States Patent Office 2,877,285
Patented Mar. 10, 1959

2,877,285

PRIMARY CELL CONSTRUCTION

Walter R. Kempf, Lancaster, Pa., assignor to Hamilton Watch Company, Lancaster, Pa., a corporation of Pennsylvania Application December 2, 1955, Serial No. 550,565

7 Claims. (Cl. 136—111)

This invention relates to improved electric current producing primary dry cells.

In alkaline dry cells having a zinc anode and a depolarizing cathode comprising a compressed coherent mass including an oxygen yielding compound of a metal, electro chemical operation of the cell results in the reduction of the oxygen yielding metal compound to yield free metal which, in the case of mercuric oxide cathodes, is free mercury which collects in globules about the cathode. If these conducting globules are successful in electrically bridging the gap between the anode and the cathode the cell is short circuited and rendered useless. In addition to this, there is also a tendency for deleterious materials to become detached from the depolarizer cathode and migrate to the anode with a concomitant decrease in the efficiency of the cell.

In order to prevent these occurrences to as great an an extent as possible it has been common to cover the cathode with a minutely porous and ionically permeable barrier disc which is permeable to the electrolyte but which substantially limits or prevents the travel of the aforementioned deleterious materials. Generally speaking this barrier disc is held in position by the electrolyte pad adjacent thereto, although in certain instances insulating rings have been set on top of the barrier and against the side wall of the cell.

During electro chemical operation of the cell the chemical reduction of the cathode depolarizer causes a decrease in its physical size and a change in its physical shape with the result that there is a tendency for the barrier to become cocked or otherwise displaced so that its sealing function, particularly at the edges thereof, is seriously impaired. This condition has been particularly aggravated in cells which rely solely upon the electrolyte pad to hold the barrier in position, but is also troublesome in cells using circular sealing rings with a rectangular cross section since free mercury tends to seep along the walls of the cell casing between the walls and the ring to ultimately short circuit the cell elements.

According to the present invention it has been found that these disadvantages may be minimized or substantially eliminated through the use of a hold down washer of a particular shape, which, by reason of its shape, may be maintained in tight and intimate contact with the sides of the battery case so as to prevent any free metal or other deleterious materials from seeping or moving between the washer and the battery case to ultimately short circuit or destroy the efficiency of the cell. The washer maintains a continuous downward pressure upon the barrier to maintain its relationship with respect to the cathode depolarizer despite the fact that the depolarizer cathode decreases in size during electro chemical operation of the cell.

It has been found that these two functions, that is, the function of tightly sealing against the cell casing and the function of continuously forcing the barrier downwardly against the cathode depolarizer, may be effectuated by means of a cup shaped washer having a rim portion of rhomboidal cross section extending upwardly and outwardly from an imaginary horizontal plane and having a flange portion attached to the rim portion and extending downwardly and inwardly from the same imaginary horizontal plane.

When a washer of this type is utilized in a dry primary cell, particularly small cells of the wafer shaped type, not only is cell efficiency maintained and short circuiting prevented, but electrolyte leakage is also largely eliminated.

It is accordingly a primary object of the present invention to provide an improved electric current producing dry primary cell.

It is another object of the invention to provide an improved electric current producing dry primary cell including a washer in tight and intimate contact with the sides of the cell case and having an inwardly extending flange for maintaining the cell elements in position.

It is another object of the invention to provide an improved electric current producing dry primary cell including a washer having a rim portion in tight and intimate contact with the sides of the cell case and having a flange portion which engages a barrier in the cell with a downward pressure which continues throughout the life of the cell.

It is another object of the invention to provide an improved electric current producing dry primary cell including a washer which acts in conjunction with the sealing washer of the cell gasket to help prevent leakage through the case or through the seal of the case.

It is another object of the invention to provide an improved electric current producing dry primary cell including a barrier hold down washer which is so shaped and which engages the sides of the case in such a manner that any free mercury which is formed in the cell is channeled to a position where it cannot short circuit the cell.

It is another object of the invention to provide a novel washer for use in electric current producing dry primary cells.

It is another object of the invention to provide a primary dry cell having an improved barrier hold down washer which maintains the barrier and cathode depolarizer in position while preventing flow of free metal, mercuric oxide particles or deleterious materials between the washer and the cell casing.

It is a still further object of the invention to provide a primary dry cell including a washer which engages the barrier with a downward pressure and which urges the barrier and the adjacent electrolyte pad downward against and into contact with the mercuric oxide cathode depolarizer even after the cathode depolarizer has been reduced in size.

These and further objects and advantages of the invention will become apparent upon reference to the following specification and claims and the appended drawings wherein:

Figure 3:
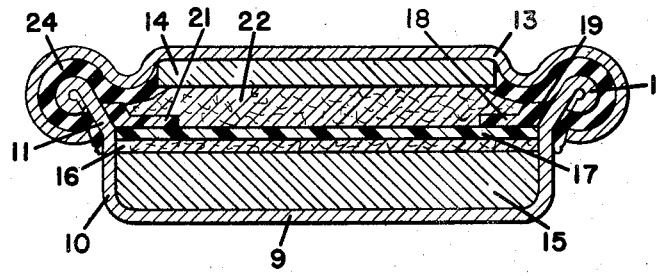
Figure 3 is a vertical cross section of a primary cell showing the position of the different cell elements prior to use of the cell.

Referring particularly to Figure 3 a battery case is shown having a lower section 9 formed with a vertical wall 10 and an upper section having a diverging wall 11 terminating in a rolled rim 12. A cap 13 is adapted to be press fitted around the rolled edge 12 and carries a zinc anode 14. The lower section of the case houses the mercuric oxide cathode depolarizer 15, an electrolyte carrying pad 16 and a barrier disc 17. Located just above the barrier disc is the sealing hold down washer 18.

Figure 1:
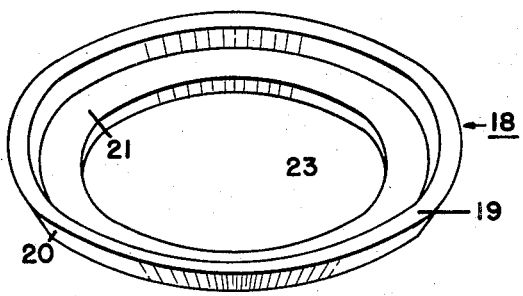
Figure 1 is a perspective view of the barrier hold down washer.
Figure 2:
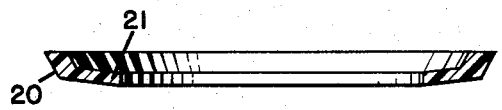
Figure 2 is a vertical cross section of the hold down washer of Figure 1.

Referring particularly to Figures 1 and 2, the hold down washer 18 is formed with a thick circular rim 19 having a shape, rhomboidal in cross section, and having its side 20 at an angle which corresponds to the angle of the diverging wall of the upper section of the case. Extending inwardly from the rim 19 is a flange 21. The washer is a molded washer and the flange 21 extends from the rim 19 at such an angle as to be below a horizontal plane passing through the bottom of the rim, the angle between the rim and the flange being greater than 90°.

Figure 4:
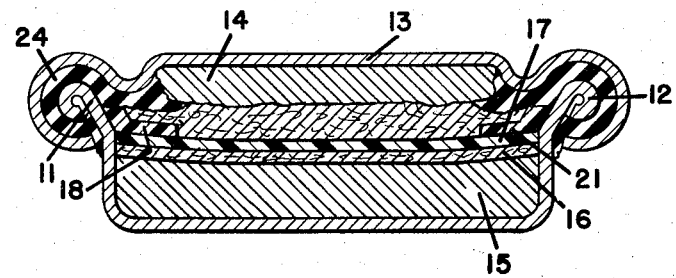
Figure 4 is a vertical elevation similar to Figure 3 showing the position of the cell elements of Figure 3 after the cell has been partially discharged.

Again referring to Figure 3, an electrolyte carrying pad 22 is between the hold down washer and the anode 14, extending down into the opening 23 of the hold down washer to contact the barrier 17. It will be seen from Figure 3 that when the cap 13 is in sealing position with the case, the rim 19 of the washer is pressed downwardly by engagement with the sealing gasket 24 so that its side wall 20 closely engages the diverging wall 11 of the case and the flange 21 is pressed into a position parallel to the base of the case by engagement with the barrier disc 17. In this position the flange 21, due to its inherent resiliency, tends to exert pressure downward against the barrier disc 17 so that (Figure 4) when the cathode 15 becomes reduced in size as the cell is used, the pressure exerted by the flange 21 downward against the barrier disc 17 holds the electrolyte pad 16 in close engagement with the cathode.

By exerting pressure against the barrier disc the hold down washer also prevents that disc from tilting at the edges and channels the flow of ions towards the center of the battery. The tight fitting engagement between the side wall 20 of the washer and the diverging wall 11 of the case provides a seal which prevents migration of any deleterious particles from the mercuric oxide when the battery first is operated, and after a period of operation serves to prevent the possibility of a short circuit by tiny globules of free mercury forming along the sides of the case and extending up to the anode.

The hold down washer by reason of having its outside wall conform to the shape and diameter of the flared sides of the upper section of the battery case fits tightly against these flared sides and is held at the juncture of the upper section and the lower section of the battery case against any further downward movement. It will thus be seen that in the sealing operation the sealing washer 24 is pressed tightly against the upper surface of the hold down washer and as the hold down washer is unable to move downward in the battery, the contact between the sealing washer and the hold down washer is very tight. This seals the wall of the entire upper section and the metallic parts of the case against any deleterious particles or against any contact with the electrolyte. The washer thus serves to channel the ion flow to the center and to prevent any contact with any of the matter carried within the battery with the sides of the cap or the upper section of the case.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a primary cell, a case having a bottom section and a flared upper section, a cathode in said bottom section, a pad containing an electrolyte positioned above said cathode, a barrier disc in contact with said electrolyte pad, a washer closely engaging the side of said upper section and formed with a flange, said washer comprising an upwardly and outwardly extending rim portion and an inwardly and downwardly extending portion which constitutes said flange, said flange contacting and exerting a downward force on said barrier disc to force said barrier disc into engagement with said electrolyte pad and said pad into engagement with said cathode, a second electrolyte pad above said washer and a cap carrying an anode sealed to the upper section of said case.

2. In a primary cell, a case having a vertical wall bottom section and a flared wall upper section, a cathode in said bottom section, a pad containing an electrolyte positioned above said cathode, a barrier disc in contact with said electrolyte pad, a resilient washer closely engaging the flared side of said upper section and formed with a flange, said washer comprising an upwardly and outwardly extending rim portion and an inwardly and downwardly extending portion which constitutes said flange, said flange contacting and exerting a downward force on said barrier disc to force said barrier disc into engagement with said electrolyte pad and said pad into engagement with said cathode, a second electrolyte pad above said washer and in contact with said barrier disc, and a cap carrying an anode sealed to the upper section of said case.

3. In a primary cell, a case having a vertical wall bottom section and a flared wall upper section, a cathode in said bottom section, a pad containing an electrolyte positioned above said cathode, a barrier disc in contact with said electrolyte pad, said barrier disc engaging the vertical wall of said bottom section at the juncture of said bottom and top sections, a resilient washer having its outer wall formed to fit the flared wall of the upper section housed within said upper section and terminating at the juncture of said upper section with said lower section, and an inwardly directed flange formed at a downward angle to the horizontal plane of said washer and restricted from extending into said bottom section by contact around the circumference of said barrier disc, the inherent resiliency of said flange forcing said barrier disc into engagement wtih said electrolyte pad and said pad into engagement with said cathode a second electrolyte carrying pad above said washer and in contact with said barrier disc through the open section of said washer, and a cap carrying an anode sealed to the upper section of said case.

4. In a primary cell, a case having a vertical wall bottom section and a flared wall upper section, a cathode in said bottom section, a pad containing an electrolyte positioned above said cathode and within said vertical wall bottom section, a barrier disc in contact with said electrolyte pad, said barrier disc engaging the vertical wall of said bottom section and in contact with said electrolyte pad, a resilient washer at the juncture of said upper section and said lower section, said washer being formed with a rim portion and an inwardly directed flange portion, said rim portion engaging the flared side of the upper section to effectively prevent the passage of deleterious particles between said washer and said flared side wall and said flange portion extending inwardly and downwardly in serving to force said barrier disc into engagement wtih said electrolyte pad and said pad into engagement with said cathode, and also serve to channel the ion flow towards the center of said cell, a second electrolyte carrying pad above said washer and in contact with said barrier disc through the open section of said washer, and a cap carrying an anode sealed to the upper section of said case.

5. In a primary cell, a case having a vertical wall bottom section and a flared wall upper section, a cathode, an electrolyte pad and a barrier disc within said vertical wall bottom section, a resilient washer having a rim portion and an inwardly directed flange portion positioned at the juncture of said flared upper section with said vertical wall lower section, the rim portion of said washer in sealing contact with the flared wall of said upper section, said rim portion being held at the juncture of said flared upper section with said vertical wall bottom section by the constricting of said flared upper section wall, the inwardly directed flange portion being arranged at an angle to the horizontal plane of said washer to normally project into said bottom section, said flange portion forcing said barrier disc into engagement with said electrolyte pad and said pad into engagement with said cathode a second electrolyte pad carried above said washer and in contact with said barrier disc, a cap carrying an anode centrally of said cap and a circumferential insulating washer carried by said cap and in contact with said anode, said cap being sealed to said case, said insulating washer being forced into tight engagement with said resilient washer during the sealing operation.

6. In a primary cell, a case having a bottom section and a flared upper section, a cathode assembly in said bottom section having a barrier disc at the top thereof, an annular washer in said case above said barrier disc, said washer comprising an annular upstanding portion extending upwardly and outwardly at an angle to the vertical and snugly engaging said flared upper section and an annular inwardly extending portion connected to said upstanding portion and extending inwardly and downwardly at an angle to the horizontal, said inwardly extending portion engaging said barrier disc to hold the elements of said cathode assembly in contact with one another and in contact with the bottom of said case, an electrolyte and anode assembly mounted over said barrier disc, and a cap sealed to the upper section of said case.

7. In a primary cell as set out in claim 6, including an insulating washer insulating said cap from said case and engaging the upstanding portion of said annular washer to force the inwardly extending portion thereof into tight engagement with said barrier disc.

References Cited in the file of this patent
UNITED STATES PATENTS

| | | |
|---|---|---|
| 2,375,875 | Sanderson | May 15, 1945 |
| 2,505,835 | Richardson et al. | May 2, 1950 |
| 2,593,893 | King | Apr. 22, 1952 |
| 2,677,716 | MacFarland | May 4, 1954 |